(12) United States Patent
Zayic et al.

(10) Patent No.: US 7,321,804 B2
(45) Date of Patent: Jan. 22, 2008

(54) METHOD FOR PROCESS-DRIVEN BILL OF MATERIAL

(75) Inventors: Jerry D. Zayic, Renton, WA (US);
Carl E. Bouffiou, Tacoma, WA (US);
Joe Anelle, St. Louis, MO (US);
Robert J. Schreiber, St. Louis, MO (US); Steve DuPont, Kent, WA (US);
Steve E. Franzen, St. Charles, MO (US); Brad J. Harrison, Yelm, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/013,311

(22) Filed: Dec. 15, 2004

(65) Prior Publication Data

US 2006/0129262 A1 Jun. 15, 2006

(51) Int. Cl.
*G06F 19/00* (2006.01)
(52) U.S. Cl. ...................... 700/107; 700/106
(58) Field of Classification Search .............. 700/106, 700/107
See application file for complete search history.

(56) References Cited

U.S. PATENT DOCUMENTS

| | | | |
|---|---|---|---|
| 5,247,651 A | 9/1993 | Clarisse | |
| 5,479,343 A | 12/1995 | Matoba et al. | |
| 5,764,953 A | 6/1998 | Collins et al. | |
| 5,850,345 A | 12/1998 | Son | |
| 5,867,713 A | 2/1999 | Shrader et al. | |
| 6,782,295 B2 | 8/2004 | Martz, Jr. et al. | |
| 6,820,042 B1 | 11/2004 | Cohen et al. | |
| 6,826,518 B1 | 11/2004 | Ivezic et al. | |
| 6,983,232 B2 | 1/2006 | Nguyen et al. | |
| 2002/0038163 A1 | 3/2002 | Hazama | |
| 2004/0210467 A1* | 10/2004 | Yokoyama | 705/8 |
| 2004/0255236 A1 | 12/2004 | Collart | |

FOREIGN PATENT DOCUMENTS

WO  WO 03/007098  * 1/2003

OTHER PUBLICATIONS

Ou-Yang, C., Jiang, T.A. "Developing an Integration Framework to Support the Information Flow Between PDM and MRP". International Journal of Advanced Manufacturing Technology (2002) 19: 131-141.*

(Continued)

*Primary Examiner*—Ryan A. Jarrett
(74) *Attorney, Agent, or Firm*—Lee & Hayes, PLLC

(57) ABSTRACT

The present invention is directed to systems and methods for compiling production and planning information. In one embodiment, a system for planning the production of a product includes at least one database configured to store engineering information related to the product, and further configured to store process information related to the product, and a processor coupled to the at least one database to combine selected information from the at least one database to generate a manufacturing planning document that defines the product. In another embodiment, a method of generating a manufacturing bill of material for a selected product includes compiling a process data structure from the process information, compiling a product data structure from the engineering information, and generating a manufacturing bill of material by combining the process data structure and the product data structure.

6 Claims, 4 Drawing Sheets

OTHER PUBLICATIONS

"7E7 Process and System Integration Decision Memo", Installation Plan Fulfills Types, Boeing, pp. 14, 2005.
"PES(Product Enhancement Specifications)-Manufacturing Context Visualization Capabilities", Dassault Systemes, pp. 1-6, 2003.
"PES Filter the Computed Manufacturing Context based on Certain Attributes for Product & Resource", Dassault Systemes, pp. 1-14, 2003.
"PES Enhancement Computation of Manufacturing Context in Max Mode", Dassault Systemes, pp. 1-12, 2005.
"PES Display the Manufacturing Context Data in the State Associated to the Process", Dassault Systemes, pp. 1-15, 2005.
"PES Standard Volumetric Filter to Filter Compound Manufacturing Context", Dassault Systemes, pp. 1-24, 2005.
"Process Analyzer 4.5 User Manual", Boeing Phantom Works, The Boeing Company, pp. 1-75, Jun. 15, 2004.
"Integrated Product & Process Structure White Paper", Engineering Process Council, Boeing, pp. 1-38, Jul. 11, 2001.
"Process Driven Manufacturing Bill of Material", Boeing, pp. 1-27, Jul. 11, 2001.

* cited by examiner

METHOD FOR PROCESS-DRIVEN BILL OF MATERIAL

FIELD OF THE INVENTION

This invention relates generally to information technology, and more particularly, to systems and methods for compiling production and planning information.

BACKGROUND OF THE INVENTION

Complex manufacturing projects such as the design and manufacture of aircraft require that engineering information, component parts and processes be successfully integrated. With regard in particular to the production of aircraft, typically hundreds of thousands of parts and associated processes must be integrated according to a comprehensive plan to produce an aircraft in accordance with the engineering information.

Engineering information typically includes engineering drawings and parts lists that, when combined, form an engineering product structure generally known as an Engineering Bill of Material (EBOM). The EBOM describes how materials, components assemblies and sub-assemblies must be combined to form the desired product, and thus defines the as-designed configuration of the product. A Manufacturing Bill of Material (MBOM) is generated from the EBOM and a manufacturing process plan so that a list of parts may be scheduled for assembly of the product on the factory floor. The manufacturing process plan typically includes factory floor planning, tool planning and scheduling, compilation of work plans for assembly personnel, assembly plans, and other similar activities. Accordingly, the MBOM generally defines an as-planned configuration for the product.

The as-designed configuration and the as-planned configuration for the product often require reconciliation before production may occur. For example, the as-planned configuration may require assembly of the product in a sequence not contemplated in the as-designed configuration, or alternately, the as-planned configuration may require the modification of a part in the as-designed configuration in order to facilitate the installation of the part into the final product. In addition, over the production lifetime of the product, various production differences may occur, including component, tooling and material substitutions, and/or labor reallocations instituted as timesaving measures. Consequently, considerable effort is generally required to accurately maintain the MBOM.

Current systems and practices used to formulate the MBOM are serially executed, and are highly fragmented. Consequently, significant amounts of time must be devoted to formulation and/or reconciliation of the MBOM. Further, current systems and practices generate numerous errors that require the expenditure of still more time to correct.

SUMMARY OF THE INVENTION

The present invention comprises systems and methods for compiling production and planning information. In one aspect, a system for planning the production of a product includes at least one database configured to store engineering information and process information related to the product, and a processor coupled to the at least one database to combine selected information from the at least one database to generate a manufacturing planning document that defines the product. In another aspect, a method of generating a manufacturing bill of material for a selected product includes compiling a process data structure from the process information, compiling a product data structure from the engineering information, and generating a manufacturing bill of material by combining the process data structure and the product data structure.

BRIEF DESCRIPTION OF THE DRAWINGS

Preferred and alternate embodiments of the present invention are described in detail below with reference to the following drawings.

DETAILED DESCRIPTION OF THE INVENTION

The present invention relates to systems and methods for compiling production and planning information. Many specific details of certain embodiments of the invention are set forth in the following description and in FIGS. 1 through 4 to provide a thorough understanding of such embodiments. One skilled in the art, however, will understand that the present invention may have additional embodiments, or that the present invention may be practiced without several of the details described in the following description.

Figure 1:
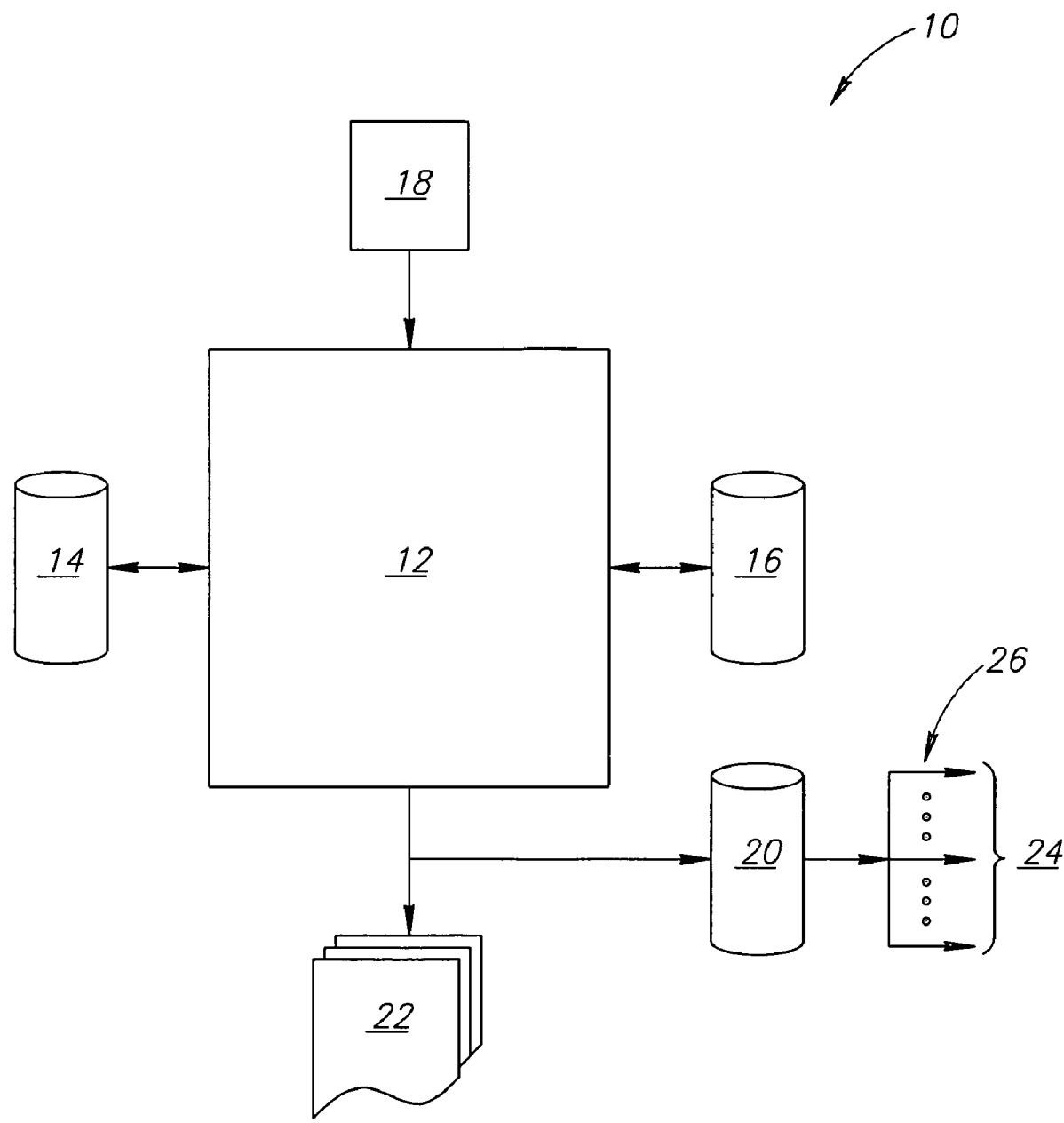
FIG. 1 is a block diagrammatic view of a production and planning processing system according to an embodiment of the invention.

FIG. 1 is a block diagrammatic view of a production planning processing system 10 according to an embodiment of the invention. The system 10 includes a processing unit 12 that generally includes any programmable electronic device that is operable to receive programming instructions and input data, and to process the data according to the programming instructions. Although a single processing unit is shown in FIG. 1, the processing unit 12 may be comprised of a plurality of processing units that are coupled serially or in parallel so that each processing unit performs a selected portion of the total computational task performed by the processing unit 12. The system 10 also includes an engineering information database 14 that is operable to store engineering information of various types. For example, the engineering information database 14 may include engineering requirements such as drawing trees that reference engineering drawings and associated parts lists that define the configuration of the product. In addition, directories that include three-dimensional digital representations of component parts may also be included in the database 14. Other information stored in the database 14 may include part tolerances, process specifications (e.g. surface finish requirements, material heat treating requirements, torque requirements and other similar information). Various analytical reports may also be included in the database 14. For example, reports that include stress, thermal, electromagnetic and fluid flow studies for various product components may be present. In addition, digital representations of the foregoing stress, thermal, electromagnetic and fluid flow studies may also be present.

The system 10 also includes a product and process structure database 16 that is operable to store product and process structures generated by the processing unit 12. The product structure and the process structure will be described in greater detail below. Briefly and in general terms, however, the process structure includes part, resource and planning relationships for a selected component part or assembly. In particular, the planning relationships may include precedence information that describes a predetermined assembly sequence for a component part or assembly. Although FIG. 1 shows separate and distinct databases, it is understood that the content of the databases 14 and 16 may be incorporated into a single database. In a particular embodiment of the invention, the product and process structures may include data structures that are created as disclosed in a commonly owned U.S. patent application Ser. No. 11/012,901, entitled "System and Method for Production Planning Analysis Using Discrete Event Simulation", which application is incorporated by reference herein.

With continued reference to FIG. 1, the system 10 includes an input device 18 that is configured to properly format information submitted to the system 10. The information provided to the input device 18 may include any engineering and/or planning data that is suited for storage in the database 14 and the database 16. The input device 18 thus provides a means for introducing engineering and/or planning data to the processing unit 12 for subsequent storage in the databases 14 and 16. Since the foregoing engineering and/or planning data is subject to constant revision, the input device 18 similarly provides a means for introducing revised data or updated information to the databases 14 and 16.

The system 10 includes a storage device 20 that receives processed information from the processing unit 12, which may include a Manufacturing Bill of Material (MBOM) 22 that describes the as-planned configuration for a desired product. Alternately, the storage device 20 may also serve as an intermediate storage location for information generated in the system 10 before the information is transferred to one or more information requesters 24 that request a transfer of desired information by means of a communications network 26.

The operation of the system 10 of FIG. 1 will now be described. As discussed above, the input device 18 may be used to transfer engineering and/or planning data to the system 10, and the data is stored in a selected one of the databases 14 and 16. The engineering data generally describes the configuration of a desired product, such as a commercial or military aircraft, while the planning data generally comprises a scheduling definition, which is generally expressed as a precedence network. The processing unit 12 extracts required information from the database 14 and also extracts required information from the database 16 and generates a process structure and a product structure, respectively. The product structure generally defines fundamental objects employed in the assembly of the product, while the process structure generally provides an ordering of the assembly of component parts into the product. The product structure and the process structure will be described in grater detail below. When the processing unit 12 generates the process structure, the processing unit 12 may advantageously access three-dimensional digital models (e.g., models created using the CATIA digital modeling system, or other similar modeling systems) stored in the engineering database 16 to determine if component part or assembly conflicts occur. Accordingly, if such conflicts occur, the precedence information for the affected part or assembly may be readily altered to specify a different assembly sequence that avoids the conflict. If differences arise that cannot be reconciled, the processing unit 12 generates an indication that the submitted data cannot be reconciled.

The processing unit 12 may then dynamically combine the process structure and the product structure to generate the MBOM 22. Since known methods for generating a manufacturing bill of material generally involve a plurality of planning activities conducted by many individual participants, the compiled bill of material frequently includes errors and/or inaccuracies that are often resolved informally at the production level. The MBOM 22 generated by the foregoing embodiment exhibits fewer errors than conventional methods, and also conveniently allows differences between engineering information and process information to be reconciled.

Figure 2:
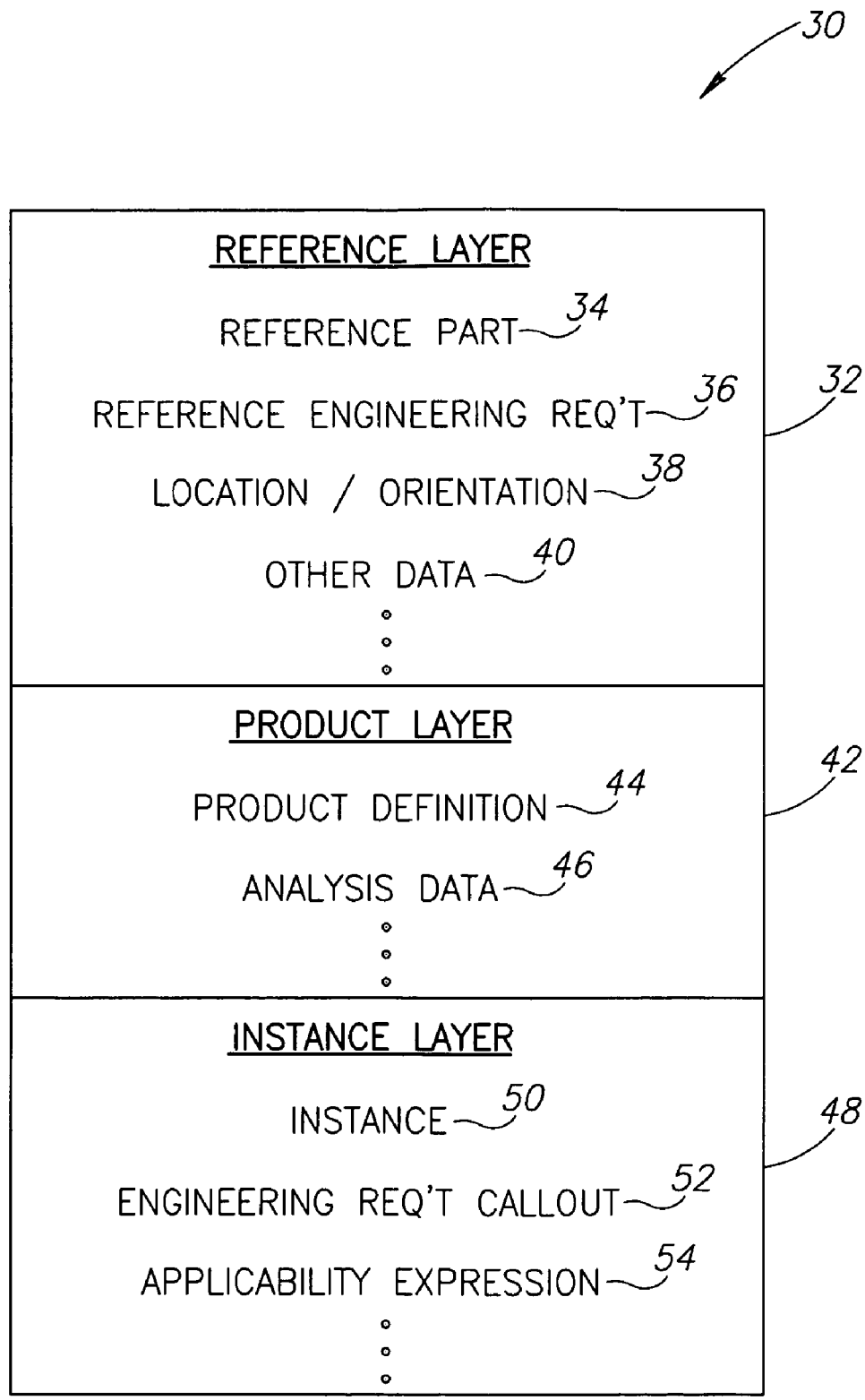
FIG. 2 is a block diagrammatic representation of a product structure employed with the system of FIG. 1.

FIG. 2 is a block diagrammatic representation of a product structure 30 that may be processed by the system 10 of FIG. 1. The product structure 30 is a data structure generated by the system 10 of FIG. 1 and may be further comprised of three interrelated layers. A reference layer 32 includes information that defines reusable objects that comprise the product. Accordingly, the reference layer 32 includes a reference part description 34 the represents a physical item that will be produced or physically utilized in the production process. The reference part description 34 may be incorporated into the product more than one time and at more then one location. The reference pad 34 may comprise a single part, or alternately, may be comprised of an assembly of parts, so that the reference part description comprises a sub-assembly of the product. The reference layer 32 may also include a reference engineering requirement 36 the describes an engineering drawing or pads list. As discussed more fully above, engineering data resides on the system 10 of FIG. 1 in the engineering database 14, which may be used to provide the reference engineering requirement 36. A location and orientation description 38 provides a location for the reference part 34 and a preferred direction for installing the reference part 34. Other data 40 may include, but is not limited to, part master and part version infonnation. The part master includes information for the reference part 34 that generally does not change. For example, a part master may include a part number. The other data 40 may also include a part version that is used to discriminate the reference part 34 from earlier versions. A loft and master definition file may also be in the other data 40. The loft and master definition file defines a shape of the reference part 34.

The product definition 30 further includes a product layer 42 that describes an end product definition. Accordingly, the product layer 42 includes a product definition 44 that provides the engineering definition for the reference part 34. The engineering definition includes, for example, component parts, products, and engineering requirements. The product layer 42 also includes analysis data 46 that includes various reports documenting stress, thermal, fluid and/electrical analyses. As discussed above, this information may also be stored in the engineering database 16 of FIG. 1.

The product definition 30 further includes an instance layer 48 that generally defines the usage of the reference part 34 in the product. The instance 50 accordingly defines the location and orientation of the reference part 34 on a product. The instance 50 is generally location-specific and cannot therefore apply to a different location on the product. The instance layer 48 also includes an engineering requirement callout 52 that defines one or more particular requirements that must be met in the reference part 34. An applicability expression 54 may also be present that defines when the use of the reference part 34 is valid for the product.

Figure 3:
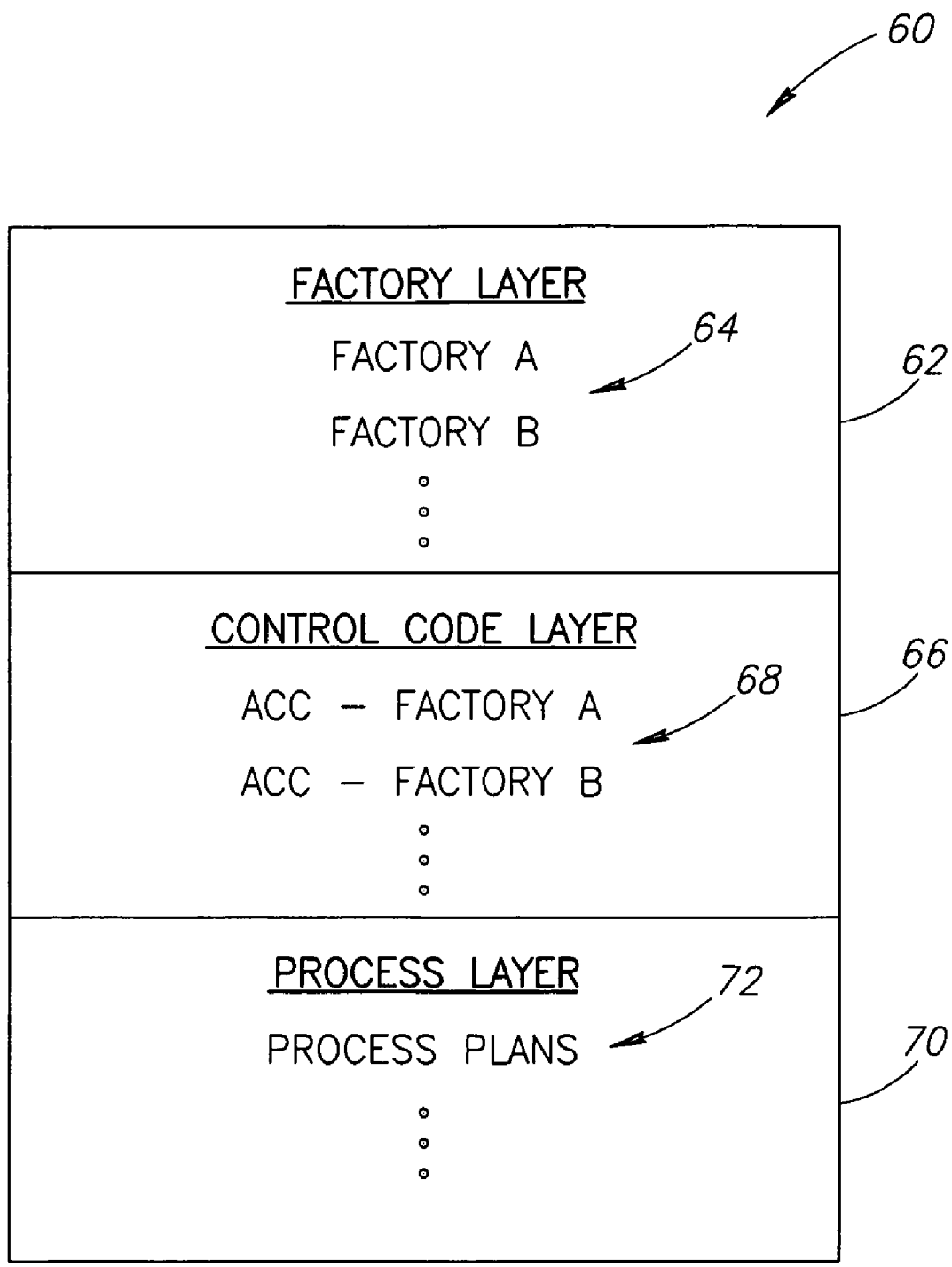
FIG. 3 is a block diagrammatic representation of a process structure employed with the system of FIG. 1.

FIG. 3 is a block diagrammatic representation of a product structure 60 that may be processed by the system 10 of FIG. 1. The product structure 30 (FIG. 2) is also a data structure that is generated by the system 10 of FIG. 1. The process structure 60 may be further comprised of three inter-related layers. A factory layer 62 generally provides information regarding the facilities available at a selected factory 64, and may include information that defines a factory floor layout, tooling and fixtures available at the selected factory 64, as well as other location-specific information. A control code layer 66 provides information regarding specific physical work areas that are present in the selected factory 64. Accordingly, each area control code (ACC) 68 includes precedence information that describes how the product must be assembled within the selected factory 64. The ACC 68 thus controls a workflow in the selected factory 64. The process structure 60 also includes a process layer 70 that includes one or more process plans 72. The process plans 72 may include a precedence network that orders the operations that must be performed to accomplish the various tasks required to assemble the product.

Figure 4:
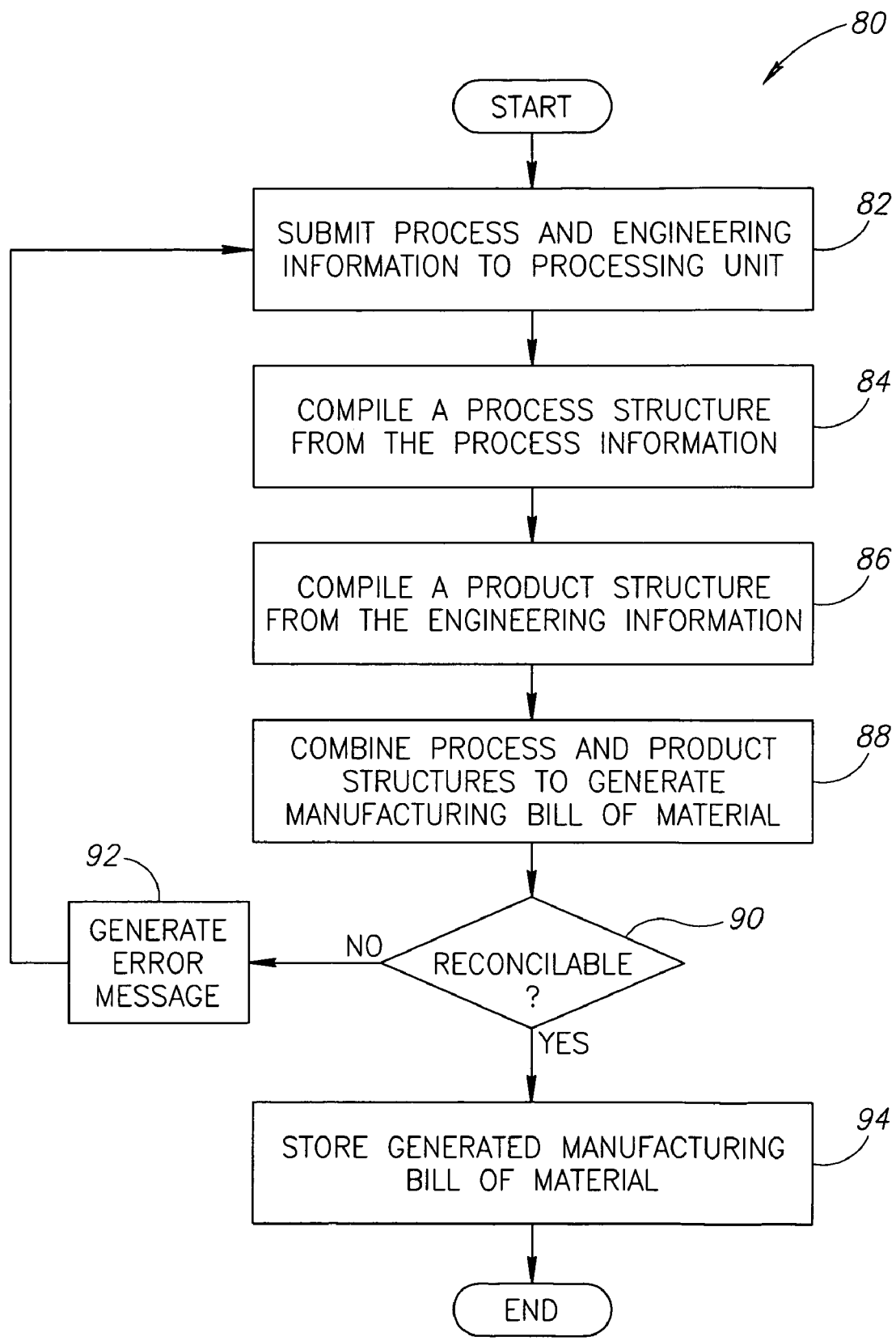
FIG. 4 is a block diagrammatic view of a method for generating a manufacturing bill of material according to still another embodiment of the invention.

FIG. 4 is a block diagrammatic view of a method 80 for generating a manufacturing bill of material according to still another embodiment of the invention. At block 82, process related information and engineering information is provided to the system 10 of FIG. 1 through the input device 18, and stored in the respective databases. At block 84, a process structure as shown in detail in FIG. 3 is compiled from the information stored in the process structure database 14, and provides scheduling and planning definition for the product. The compilation process additionally reviews the submitted data to verify that the submitted information is internally consistent. If the submitted information is not internally consistent, or is incomplete, an error indication is provided so that the submitted information may be corrected. At block 86, a product structure, as shown in FIG. 2 is compiled from information stored in the engineering database 16. Again, during the compilation process, if the information is not internally consistent, or is incomplete, an error indication is generated so that the submitted information may be corrected.

At step 88, the process structure and the product structure are combined to generate the manufacturing bill of material (MBOM) that defines an as-planned configuration for the product. The resulting MBOM is checked at block 90 to verify that the process structure and the product structure are properly reconciled in the MBOM. If discrepancies exist, an error message is generated at block 92 to indicate that proper reconciliation was not achieved. A discrepancy would exist, for example, if the MBOM specified that two or more tasks were performed simultaneously, when the physical tasks must be performed successively. After the error message is generated at block 92, the method 80 returns to block 82. Otherwise, if no discrepancies are detected at block 90, the MBOM is stored at block 94, where it may be retrieved by information requesters 24 through the communications network 26, as shown in FIG. 1.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method of generating a manufacturing bill of material for a product, comprising:

transferring process information and engineering information regarding the product to a central processing unit;

compiling a process data structure from the process information;

compiling a product data structure from the engineering information; and generating a manufacturing bill of material by combining the process data structure and the product data structure, wherein the generating the manufacturing bill of material includes determining if the process data structure and the product data structure are reconcilable, and generating an error message if the process data structure and the product data structure are not reconcilable.

2. The method of claim 1, wherein compiling a process data structure further comprises combining a factory layer that includes selected information for a factory, a control code layer that includes a physical work area present in a selected factory, and a process layer that includes one or more process plans.

3. The method of claim 1, wherein compiling a product data structure further comprises generating a reference layer that includes at least one of a reference part description, a reference engineering requirement, and a location and orientation for a selected part.

4. The method of claim 1, wherein compiling a product data structure further comprises generating a product layer that includes at least a product definition and analysis data.

5. The method of claim 1, wherein compiling a product data structure further comprises generating an instance layer that includes an instance, an engineering requirement callout, and an applicability expression.

6. The method of claim 1, wherein generating a manufacturing bill of material further comprises reconciling the process data structure and the product data structure.

* * * * *